United States Patent
Fechner et al.

(10) Patent No.: US 7,811,376 B2
(45) Date of Patent: Oct. 12, 2010

(54) AQUEOUS, OLIGOESTER-BASED PIGMENT PREPARATIONS, THEIR PRODUCTION AND USE

(75) Inventors: Bjoern Fechner, Eppstein (DE);
Frank-Peter Lang, Hattersheim (DE);
Alexander Lerch, Gelnhausen (DE);
Uwe Bechtold, Bad Vilbel (DE);
Hendrik Ahrens, Frankfurt am Main (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 424 days.

(21) Appl. No.: 11/665,949

(22) PCT Filed: Sep. 29, 2005

(86) PCT No.: PCT/EP2005/010514

§ 371 (c)(1),
(2), (4) Date: Apr. 20, 2007

(87) PCT Pub. No.: WO2006/045396

PCT Pub. Date: May 4, 2006

(65) Prior Publication Data

US 2007/0261596 A1    Nov. 15, 2007

(30) Foreign Application Priority Data

Oct. 22, 2004    (DE) ....................... 10 2004 051 455

(51) Int. Cl.
C09C 1/22    (2006.01)
(52) U.S. Cl. .................... 106/460; 106/31.86; 106/420; 106/425; 106/437; 106/453; 106/455; 106/476; 106/479; 106/480; 106/496
(58) Field of Classification Search .............. 106/31.86, 106/420, 425, 437, 453, 455, 460, 476, 479, 106/480, 496, 505
See application file for complete search history.

(56) References Cited

U.S. PATENT DOCUMENTS

| | | | |
|---|---|---|---|
| 3,712,873 A | 1/1973 | Zenk | |
| 3,959,230 A | 5/1976 | Hays | |
| 4,116,924 A * | 9/1978 | Peabody | 524/270 |
| 4,156,616 A | 5/1979 | Dietz et al. | |
| 5,142,020 A | 8/1992 | Kud et al. | |
| 5,770,651 A | 6/1998 | Traubel et al. | |
| 5,777,046 A | 7/1998 | Boeckh et al. | |
| 5,855,662 A | 1/1999 | Brand et al. | |
| 5,973,026 A | 10/1999 | Burns et al. | |
| 6,153,723 A | 11/2000 | Lang et al. | |
| 6,426,063 B1 | 7/2002 | Schuler | |
| 6,478,866 B1 | 11/2002 | Nyssen et al. | |
| 7,135,067 B2 | 11/2006 | Harz et al. | |
| 2004/0171738 A1 | 9/2004 | Harz et al. | |
| 2005/0075415 A1 | 4/2005 | Harz et al. | |
| 2007/0131144 A1 | 6/2007 | Winter et al. | |

FOREIGN PATENT DOCUMENTS

| | | |
|---|---|---|
| DE | 2638946 | 3/1978 |
| DE | 4112327 | 10/1992 |
| DE | 4403866 | 8/1995 |
| DE | 19522431 | 2/1996 |
| DE | 10135140 | 1/2003 |
| EP | 0253567 | 1/1988 |
| EP | 357280 | 3/1990 |
| EP | 0442101 | 8/1991 |
| EP | 0542052 | 5/1993 |
| EP | 0803554 | 4/1997 |
| EP | 0964015 | 12/1999 |
| EP | 1049745 | 11/2000 |
| EP | 1270624 | 1/2003 |
| EP | 0735109 | 10/2006 |
| JP | 1-141968 | 6/1989 |
| WO | WO 03/006556 | 1/2006 |

OTHER PUBLICATIONS

PCT International Search Report for PCT/EP2005/010514, mailed Nov. 30, 2005.
English Translation of PCT International Report on Patentability for PCT/EP2005/010514, mailed May 3, 2007.
Co-pending U.S. Appl. No. 11/629,104, by Lang et al., filed Dec. 8, 2006.
English abstract for JP 2003096170, Apr. 3, 2003.
Machine Assisted English Translation of JP 1-141968, Jun. 2, 1989.

* cited by examiner

Primary Examiner—Melvin C Mayes
Assistant Examiner—Melissa Stalder
(74) Attorney, Agent, or Firm—Anthony A. Bisulca

(57) ABSTRACT

An aqueous pigment preparation containing: (A) at least one organic and/or inorganic pigment; (B) at least one water-soluble or water-dispersible non-ionic oligoester or polyester, which is obtained by the polycondensation of dicarboxylic acid and glycol components, said oligoester or polyester comprising I) one or more aromatic dicarboxylic acids, their esters or anhydrides, II) $C_2$-$C_8$ alkenediols, III) poly ($C_1$-$C_4$-alkene)glycols and/or methylpoly($C_2$-$C_4$ alkene)glycols, IV) optional water-soluble addition products of alkene oxide on $C_1$-$C_{24}$ alcohols, $C_6$-$C_{18}$ alkylphenols or on $C_8$-$C_{24}$ alkylamines and V) one or more optional polyols; (C) optional additional dispersants and surfactants that are conventionally used to produce aqueous pigment dispersions; (D) optional additional additives that are conventionally used to produce aqueous pigment dispersions; and (E) water.

12 Claims, No Drawings

AQUEOUS, OLIGOESTER-BASED PIGMENT PREPARATIONS, THEIR PRODUCTION AND USE

The present invention is described in the German priority application No. 102004051455.0, filed Oct. 22, 2004, which is hereby incorporated by reference as fully disclosed herein.

The present invention relates to waterborne, oligoester-based pigment preparations and pigment dispersions, to processes for producing them, and to their use for coloring natural and synthetic materials, especially aqueous coating materials, emulsion paints and colored coatings of all kinds.

For coloring in the abovementioned applications it is very common nowadays to use aqueous pigment preparations. Such preparations are described, for example, in EP 0 735 109, WO 03/006 556 or EP 1 049 745. The preparations are produced using dispersants, which provide physical stabilization of the pigment particles in finely divided form in an aqueous medium. Commonly, anionic, cationic, amphoteric or nonionic dispersants with surfactant character are employed, in macromolecular form where appropriate. Among the most frequently used dispersants are alkylaryl compounds, their oxalkylation products and sulfonation products or phosphation products, dispersants from the group of the novolaks or oxalkylated fatty acid derivatives, and polymeric dispersants consisting of the copolymers of styrene and acrylic or methacrylic acid and/or esters thereof. Furthermore, besides the surfactants or dispersants, conventional pigment preparations generally also comprise various additives such as wetting agents, thickeners, preservatives, viscosity stabilizers, fillers, and retention agents. The retention agents, often also called dryout preventatives, ensure that the product does not dry out or start to dry even prior to use. For this purpose use is made frequently of low molecular mass hygroscopic compounds such as glycols and glycerols or high molecular mass nonvolatile polymers such as polyether polyols (polyglycols).

Dispersants and additives for producing dispersions having a high pigment content must be carefully selected in order to meet necessary properties, which can be subdivided into the following three main aspects:

1) In order to achieve high color strengths and precisely defined shades at low viscosity it is necessary for the pigment particles to be very well stabilized in the dispersion by the dispersants and additives. Neither during the dispersing operation or during storage should flocculation phenomena, reagglomeration or sedimentation occur. Phenomena of this kind would otherwise lead to changes in the viscosity of the preparation and, following its incorporation into the application medium, to changes of shade and losses of color strength, opacity, gloss, homogeneity and brightness, and also to poorly reproducible shades, to running tendencies in the colored materials, and to a drop in drying resistance and dryout resistance.

2) The pigment preparations ought to be compatible as far as possible with a broad number of application media, meaning that the dispersants and additives must be compatible with such systems. They should possess, so to speak, a "universal" compatibility. If compatibility is inadequate, incorporation of the pigment preparation into the application medium will be accompanied by flocculation, reagglomeration or the formation of bits. In some cases these phenomena are observed directly by the onset of a phase separation; in other cases the incompatibility is only rendered visible by means of appropriate tests, an example being the rub-out test. In the case of the rub-out test the coating material or emulsion paint, after mixing with the pigment dispersion, is applied to an area, such as to a paint chart. Thereafter the flocculated pigment can be partly redispersed using a brush or by rubbing with finger. The rubbed area is then colored more strongly than the adjacent, untreated area. The rub-out test is a simple but effective test method for assessing the flocculation stability of pigment dispersions.

3) The pigment preparations must be ecotoxicologically unobjectionable and must be produced using dispersants which are biodegradable. There are numerous aqueous pigment preparations known which meet aspect 1); for example, from EP 0 542 052, EP 0 735 109, WO 03/006 556, EP 1 049 745, and DE 101 35 140. They possess high color strengths and defined shades at low viscosity, for which effective stabilization of the pigment particles in the dispersion is a precondition. During the dispersing operation and also during the storage there is very little if any incidence of flocculation phenomena, reagglomeration or sedimentation. These pigment dispersions, however, do not meet aspect 2), since they are not compatible with a relatively large number of different white dispersions. Thus, in general, they can be stirred into two or three different white dispersions with good compatibility, whereas with other, different white dispersions there is an incompatibility which in each case can be detected clearly by means of a rub-out test. In many cases the incompatibility in the case of at least one white dispersion tested can also be observed through an immiscibility or a clearly pronounced phase separation which generally begins immediately after the pigment preparation has been stirred into the white dispersion. The incompatibility of these pigment dispersions with a large number of different white dispersions is accompanied by many performance disadvantages.

There is therefore a need for aqueous pigment preparations which do not have the abovementioned disadvantages and which meet aspects 1) and 2) and which additionally can be produced using biodegradable dispersants and, consequently, also meet aspect 3). The object on which the present invention is based was therefore that of providing aqueous pigment dispersions which are compatible with as many white dispersions and coating materials as possible and which, accordingly, exhibit a certain "universal" compatibility. Here, in white dispersions, there should be very good compatibility in particular with silicone, PU, alkyd or acrylic dispersion binders. There should be no incompatibility observable either by a developing phase separation or by differences in the color strength during the rub-out test. Furthermore, the aqueous pigment dispersions ought to have high color strengths and defined shades at low viscosity. During the dispersing operation, during storage, and during incorporation into the white dispersion, there should be no incidence of flocculation phenomena, reagglomeration or sedimentation. Moreover, the pigment preparations ought to possess good resistance to initial drying and to dryout, and good scuff resistance and abrasion resistance.

Surprisingly it has been found that certain water-soluble or water-dispersible nonionic oligoesters and polyesters are suitable as dispersants for pigments, exhibit high compatibility for many white dispersions and coating materials, and hence achieve the abovementioned object. They are ecotoxicologically unobjectionable and biodegradable.

Nonionic oligoesters or polyesters of this kind have not hitherto been used as dispersants for aqueous pigment preparations.

U.S. Pat. No. 5,973,026 describes as polyester the ionic copoly(1,2-propylenediethylene) terephthalate-copoly(sodium sulfoisophthalate) dicarboxylate, which is used for producing ink-jet inks. This polymer, however, does not possess polyalkylene glycol or methylpolyalkylene glycol structural units in the polyester, these units being described in the present invention and being essential for steric stabilization in the dispersion, so that said dispersion is flocculation-resistant and compatible with numerous application media.

JP 2003096170 specifies ionic polyesters which are formed from sodium 5-methyl-sulfoisophthalate and bis(1-hydroxyethyl)hexahydroterephthalate and which are suitable for dispersants for producing toners. These polymers likewise do not possess polyalkylene glycol or methylpolyalkylene glycol structural units in the polyester.

JP 1-141968 discloses aromatic-aliphatic polyesters as dispersants. These polymers possess only ester bonds between the structural units, and do not possess polyalkylene glycol and methylpolyalkylene glycol structural units in the molecule. A disadvantage of such aliphatic ester bonds is that in aqueous solution they are subject to hydrolytic cleavage, and therefore have only a short lifetime and significantly reduce the storage stability of a pigment preparation.

The nonionic oligoesters or polyesters used in the present invention have to date been employed only in textile chemistry for textile finishing for the purpose of imparting water repellency, for improving moisture transport, for improving the ease with which hydrophobic stains, such as fats and oils, are washed off, and for improving the antistatic quality of polyester fabrics. Also known is their use as soil release polymers in detergents and cleaning products for textiles. There as well they serve to enhance the detachment of soil from synthetic fibers, particularly from polyester and polyester blend fabrics. Examples of water-soluble or water-dispersible oligoesters and/or polyesters are described in the following publications: U.S. Pat. No. 3,712,873, U.S. Pat. No. 3,959,230, EP 0 442 101, DE 44 03 866, EP 253 567, EP 357 280, DE 195 22 431, EP 0 964 015, and U.S. Pat. No. 6,153,723.

The water-soluble or water-dispersible oligoesters or polyesters are polycondensates based on aromatic dicarboxylic acids and glycol components which possess two or more hydroxyl groups.

The present invention provides aqueous pigment preparations comprising
(A) at least one organic and/or inorganic pigment,
(B) at least one water-soluble or water-dispersible nonionic oligoester or polyester which is obtainable by polycondensing dicarboxylic acid components and glycol components comprising
  I) one or more dicarboxylic acids, their esters or anhydrides,
  II) $C_2$-$C_8$ alkylenediols,
  III) poly($C_1$-$C_4$ alkylene) glycols and/or methylpoly($C_2$-$C_4$ alkylene) glycols,
  IV) if desired, water-soluble adducts of alkylene oxide with $C_1$-$C_{24}$ alcohols, with $C_6$-$C_{18}$ alkylphenols or with $C_8$-$C_{24}$ alkylamines, and
  V) if desired, one or more polyols,
(C) if desired, further dispersants and surfactants conventional for producing aqueous pigment dispersions,
(D) if desired, further additives conventional for producing aqueous pigment dispersions, and
(E) water.

Preferred pigment preparations comprise
(A) 5% to 80%, preferably 20% to 70%, by weight of at least one organic and/or inorganic pigment,
(B) 0.1% to 30%, preferably 1% to 15%, by weight of at least one water-soluble or water-dispersible nonionic oligoester or polyester which is obtainable by polycondensing dicarboxylic acid components and glycol components comprising
  I) 10% to 50%, preferably 15% to 30%, by weight of one or more dicarboxylic acids, their esters or anhydrides;
  II) 2% to 50%, preferably 5% to 45%, by weight of $C_2$-$C_8$ alkylenediols,
  III) 3% to 80%, preferably 5% to 75%, by weight of poly($C_1$-$C_4$ alkylene) glycols and/or methylpoly($C_2$-$C_4$ alkylene) glycols,
  IV) 0% to 10% by weight of a water-soluble adduct of alkylene oxide with $C_1$-$C_{24}$ alcohols, with $C_6$-$C_{18}$ alkylphenols or with $C_8$-$C_{24}$ alkylamines, and
  V) 0% to 10% by weight of one or more polyols, based in each case on the total weight of oligoester or polyester;
(C) 0% to 30%, preferably 0.1% to 15%, by weight of further dispersants and surfactants conventional for producing aqueous pigment dispersions,
(D) 0% to 50%, preferably 0.1% to 20%, by weight of further additives conventional for producing aqueous pigment dispersions, and
(E) 5% to 90%, preferably 5% to 78.8%, by weight of water, based in each case on the total weight of the pigment preparation.

Where one or more of components (C) and (D) are present their minimum concentration independently of one another is advantageously at least 0.01%, preferably at least 0.1%, by weight based on the total weight of the pigment preparation. The same applies to the oligoesters and polyesters: where one or more of components (IV) and (V) are present, their minimum concentration independently of one another is advantageously at least 0.01%, preferably at least 0.1%, by weight based on the total weight of the oligoester and/or polyester.

Component (A) of the pigment preparation of the invention is a finely divided organic or inorganic pigment or a mixture of different organic and/or inorganic pigments. Component (A) may also be a dye which is insoluble in certain solvents, in which it has pigment character. The pigments can be employed both in the form of dry powders and as waster-moist presscakes.

Suitable organic pigments include monoazo, disazo, laked azo, β-naphthol, naphthol AS, benzimidazolone, disazo condensation, and azo metal complex pigments, and polycyclic pigments such as phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline, and diketopyrrolopyrrole pigments, for example, or an acidic to alkaline carbon black from the group consisting of furnace blacks and gas blacks.

Among the stated organic pigments particular suitability is possessed by those which are very finely divided for the production of the preparations, with preferably 95% and more preferably 99% of the pigment particles possessing a size ≦500 nm. Depending on the pigment used, the morphology of the pigment particles may differ very sharply, and, accordingly, the viscosity behavior of the pigment preparations may be very different in dependence on the particle shape. In order to obtain ideal, Newtonian viscosity behavior in the preparations, the particles ought preferably to possess a form ranging from spherical to cubic (with flattened-off corners).

As an exemplary selection of particularly preferred organic pigments mention may be made of carbon black pigments, such as gas blacks or furnace blacks; monoazo and disazo pigments, particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and naphthol AS pigments, particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, particularly the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, particularly the Colour Index pigments Pigment Yellow 139 or Pigment Yellow 173; phthalocyanine pigments, particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone, and thioindigo pigments, particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, particularly the Colour Index pigments Pigment Red 169, Pigment Blue 56 or Pigment Blue 61; diketopyrrolopyrrole pigments, particularly the Colour Index pigments Pigment Red 254, Pigment Red 255, Pigment Red 264, Pigment Red 270, Pigment Red 272, Pigment Orange 71, Pigment Orange 73, and Pigment Orange 81.

Examples of suitable inorganic pigments include titanium dioxides, zinc sulfides, zinc oxides, iron oxides, manganese iron oxides, chromium oxides, ultramarine, nickel or chromium antimony titanium oxides, cobalt oxides, mixed oxides of cobalt and aluminum, rutile mixed-phase pigments, sulfides of rare earths, bismuth vanadates, and extender pigments.

The organic pigment is preferably combined of carbon black and/or titanium dioxide. Additionally suitable are laked dyes such as Ca, Mg, and Al lakes of dyes containing sulfonic and/or carboxylic acid groups.

In place of pigment dispersions it is also possible to prepare dispersions which comprise as solids, for example, natural finely divided ores, minerals, sparingly soluble or insoluble salts, particulate waxes or plastics, dyes, crop protection agents and pesticide agents, UV absorbers, optical brighteners, and polymerization stabilizers.

Component (B) comprises water-soluble or water-dispersible nonionic oligoesters or polyesters, which may have been synthesized on the basis of the following monomers:

The dicarboxylic acid component used comprises aromatic dicarboxylic acids, particularly terephthalic acid, isophthalic acid, phthalic acid, biphenyldicarboxylic acids, naphthalenedicarboxylic acids, trimellitic acid or trimesic acid.

Aromatic and aliphatic monocarboxylic acids can be used additionally for the purpose of controlling the molecular weight. The aromatic acids include, for example, benzoic acid and its o-, m-, and p-derivatives, e.g., toluic acid, chlorobenzoic acid, bromo-benzoic acid, nitrobenzoic acid, and hydroxybenzoic acid. Polycyclic aromatic monocarboxylic acids as well, such as α-naphthoic acid or β-naphthoic acid, can be used. The aliphatic acids include the monohydroxymonocarboxylic acids, particularly glycolic acid, lactic acid, ω-hydroxystearic acid, and ω-hydroxycaproic acid. For the purpose of the polycondensation all of the aforementioned carboxylic acids can also be used in the form of their esters or their anhydrides. Examples thereof are dimethyl terephthalate, diethyl terephthalate, and phthalic anhydride.

Suitable glycol components include the classes of compounds specified under II), III), IV), and V).

Examples of II) are ethylene glycol, 1,2-propylene glycol, 1,3-propylene glycol, 1,2-butylene glycol, 2,3-butylene glycol, 1,4-butylene glycol, pentanediols, hexanediols, and 3-methoxy-1,2-propylene glycol.

The polyalkylene glycols of III) derive preferably from ethylene oxide, propylene oxide, n-butylene oxide or isobutylene oxide. They may be homopolymers, copolymers or terpolymers of the stated alkylene oxides. The copolymers can be block copolymers, random copolymers or alternating copolymers. Preference is given to using ethylene diglycol, propylene diglycol, polyethylene glycol, polypropylene glycol, or block copolymers thereof.

Methylpolyethylene glycols can be used as monofunctional compounds for controlling the molecular weight of the oligoesters or polyesters.

The alkylene oxide adducts of IV) are, in particular, water-soluble adducts of preferably 5 to 80 mol of alkylene oxide, e.g., ethylene oxide, propylene oxide, butylene oxide or mixtures thereof, with 1 mol of $C_1$ to $C_{24}$ alcohols, $C_6$ to $C_{18}$ alkyl-phenols or $C_8$ to $C_{24}$ alkylamines.

The polyhydric alcohols (polyols) of V) have preferably 3 to 6 OH groups and are, in particular, glycerol, pentaerythritol, oligoglycerols, trimethylolethane, trimethylol-propane, 1,2,3-hexanetriol, sorbitol, and mannitol. Addition products of ethylene oxide and/or propylene oxide with the stated polyhydric alcohols may also be employed.

Oligoesters and polyesters which can be employed in accordance with the invention as component (B) preferably have the following structure:

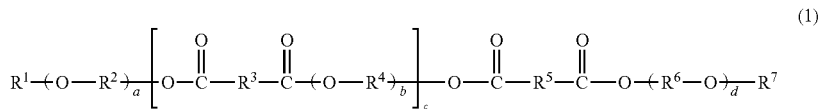

(1)

in which $R^1$ and $R^7$ are a linear or branched $C_1$-$C_{18}$ alkyl radical, $R^2$, $R^4$, and $R^6$ independently of one another are $C_1$-$C_8$ alkylene, e.g., ethylene, propylene, butylene and/or cycloalkylene radicals, e.g., 1,4-cyclo-hexylene or 1,4-dimethylenecyclohexylene radicals, and mixtures thereof, $R^3$ and $R^5$ are arylene or alkarylene, such as 1,4-phenylene, 1,3-phenylene, 1,2-phenylene, 1,8-naphthylene, 1,4-naphthylene, 2,2'-biphenylene, 4,4'-biphenylene, and mixtures thereof, a, b, and d are a number between 1 and 200, the sum of a, b, and d being at least 5;

c is a number between 1 and 20.

Preferred oligoesters and polyesters of formula (1) are those wherein $R^1$ and $R^7$ are methyl and/or ethyl, $R^2$, $R^4$, and $R^6$ are ethylene, 1,2-propylene, or mixtures thereof, $R^3$ and $R^5$ are 1,4-phenylene and 1,3-phenylene, a, b, and d are a number between 1 and 100, the sum of a, b, and d being at least 5;

c is a number between 1 and 10.

Preferred oligoesters and polyesters are, furthermore, those of the formula (2)

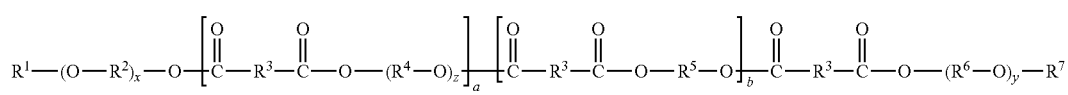

(2)

in which $R^1$ and $R^7$ are a linear or branched $C_1$-$C_{18}$ alkyl radical, $R^2$ and $R^6$ are ethylene, $R^3$ is 1,4-phenylene or 1,3-phenylene, $R^4$ is ethylene, $R^5$ is ethylene, 1,2-propylene or a combination thereof, x and y independently of one another are a number between 1 and 500, z is a number between 10 and 140, a is a number between 1 and 12, b is a number between 7 and 40, with a+b being at least 11.

With particular preference, independently of one another in formula (2)

$R^1$ and $R^7$ are a linear or branched $C_1$-$C_4$ alkyl radical, $R^2$ and $R^6$ are ethylene, $R^3$ is 1,4-phenylene or 1,3-phenylene, $R^4$ is ethylene, $R^5$ is ethylene, 1,2-propylene or a combination thereof, x and y independently of one another are a number between 3 and 45, z is a number between 18 and 70, a is a number between 2 and 5, b is a number between 8 and 12, a+b being a number between 12 and 17.

The oligoesters and polyesters described for component (B) are fully biodegradable. They are degraded to a large extent in accordance with the OECD test methods after the corresponding time.

Serving as component (C) of the pigment preparations of the invention are conventional dispersants and surfactants that are suitable for producing aqueous pigment dispersions or mixtures of such substances. It is usual to use anionic, cationic, amphoteric or nonionic surface-active compounds for this purpose. Particularly well established among these are dispersants which possess one or more medium-length or long hydrocarbon chains, in part including those which possess aromatic ring groups. Of the multiplicity of compounds, only a selection will be cited at this point, but without restricting the applicability of compounds of the invention to these examples. Examples are alkyl sulfates such as lauryl sulfate, stearyl sulfate or octadecyl sulfate, primary alkylsulfonates such as dodecylsulfonate, and secondary alkylsulfonates, particularly the sodium salt of $C_{13}$-$C_{17}$ alkane-sulfonate, alkyl phosphates, alkylbenzenesulfonates such as dodecylbenzenesulfonic acid, and all salts of these compounds. Soya lecithin is additionally suitable, or condensation products of fatty acid and taurine or hydroxyethanesulfonic acid are used, as are alkoxylation products of alkylphenols, castor oil rosin esters, fatty alcohols, fatty amines, fatty acids and fatty acid amides; these alkoxylation products may likewise have been equipped with ionic end groups: for example, as sulfosuccinic monoesters or else as sulfonic, sulfuric, and phosphoric esters, and also salts thereof, the sulfonates, sulfates or phosphates. Also suitable are oxalkylated addition compounds which are obtained by reacting polyepoxides with amines or bisphenol-A or else bisphenol-A derivatives with amines, and so, too, are urea derivatives in a similar way.

Likewise suitable are reaction products of substituted and unsubstituted long-chain and shorter-chain alkylphenols and also their polymeric derivatives, e.g., formaldehyde condensation products, the novolaks. Mention may also be made of nonionic alkoxylated styrene-phenol condensates, which are obtained by addition reaction of unsubstituted or substituted styrenes with unsubstituted or substituted phenols and reaction with ethylene oxide and/or propylene oxide, and also the ionically modified derivatives of these, in the form of sulfonic, sulfuric, and phosphoric esters, for example, and also their salts, the sulfonates, sulfates or phosphates. Suitable surface-active compounds of component (C) include, moreover, lignin-sulfonates and polycondensates of β-naphthalenesulfonic acid and formaldehyde, and also of alkylarylsulfonic acids, haloarylsulfonic acid, sulfonated phenols or sulfonated β-naphthols with formaldehyde. Also suitable, finally, are polymeric dispersants, examples being aqueous acrylate resin solutions with a strength of preferably 5 to 40 percent by weight and formed from dissolved polyacrylates which have been brought into solution with the aid of bases, by neutralization of the vinylic acid units. The polyacrylates used for this purpose are frequently copolymers composed essentially of 30 to 80 mol % of monoalkylene aromatics and 20 to 70 mol % of acrylic and/or methacrylic acids and/or esters of acrylic and/or methacrylic acid. The polyacrylates usually have number-average molar masses $M_n$ of between 1000 and 100 000 g/mol, preferably 2000 to 50 000 g/mol.

As component (D) use is made, for example, of cationic, anionic, amphoteric or nonionic compounds which promote pigment wetting (wetting agents). Also employed are thickeners, preservatives, viscosity stabilizers, grinding assistants, fillers, and hydrotropic retention agents.

Suitable retention agents include compounds which where appropriate also serve as solvents, examples being formamide, urea, tetramethylurea, ε-caprolactam, ethylene glycol, propylene glycol, diethylene glycol, triethylene glycol, polyethylene glycol, α-methyl-ω-hydroxy-polyethylene glycol ethers, dipropylene glycol, polypropylene glycol, copolymers of ethylene glycol and propylene glycol, butyl glycol, methyl-cellulose, glycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate or sodium butyl monoglycol sulfate.

Further customary additives possible are antisettling agents, light stabilizers, anti-oxidants, devolatilizers/defoamers, foam reducers, anticaking agents, and additives which favorably influence the viscosity and rheology.

Suitable agents for regulating the viscosity include, for example, polyvinyl alcohol and cellulose derivatives. Water-soluble natural or synthetic resins and also polymers as film formers or binders for increasing adhesion and abrasion resistance are likewise suitable. pH regulators employed include organic or inorganic bases and acids. Preferred organic bases are amines, such as ethanolamine, diethanolamine, triethanolamine, N,N-dimethylethanolamine, diisopropylamine, aminomethylpropanol or dimethylaminomethylpropanol, for example. Preferred inorganic bases are sodium hydroxide, potassium hydroxide, lithium hydroxide or ammonia.

Further customary additives may also be fats and oils of vegetable and animal origin, examples being bovine tallow, palm kernel fat, coconut fat, rapeseed oil, sunflower oil, linseed oil, palm oil, soya oil, peanut oil, and whale oil, cottonseed oil, corn oil, poppy oil, olive oil, castor oil, colza oil, safflower oil, soybean oil, sunflower oil, herring oil, and sardine oil. Further customary additives include the saturated and unsaturated higher fatty acids, e.g., palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid, and ricinoleic acid, and also their salts.

Water used for producing the pigment preparations, component (E), is employed preferably in the form of demineralized or distilled water. Drinking water (mains water) and/or water of natural origin may also be used.

The present invention additionally provides a process for producing the pigment preparations of the invention, which comprises dispersing component (A) in the form of powder, granules or aqueous presscake in the presence of water (E) and of component (B), then mixing in, where appropriate, water, and also, where appropriate, (C) and/or (D), and adjusting the resultant aqueous pigment dispersion to the desired concentration with water. Preferably components (B) and, where appropriate, (C) and/or (D) are first of all mixed and homogenized, and then component (A) is stirred into the prepared mixture, with the pigment being pasted up and predispersed. Depending on the harshness of grain of the pigments employed, this may be followed by fine division or find dispersion, with the aid of a milling or dispersing apparatus, if appropriate with cooling. Agitator mechanisms, dissolvers (sawtooth stirrers), rotor-stator mills, ball mills, agitator ball mills such as sand mills and bead mills, high-speed mixers, kneading apparatus, roll mills or high-performance bead mills may be used for this purpose. The pigments are finely dispersed or milled until the desired particle size distribution is reached, in operations which can take place at temperatures in the range from 0 to 100° C., advantageously at a temperature between 10 and 70° C., preferably at 20 to 60° C. Following the fine dispersing the pigment preparation can be diluted further with water, preferably deionized or distilled water.

The pigment preparations of the invention are suitable for pigmenting and coloring natural and synthetic materials of all kinds, particularly aqueous coating materials, emulsion paints, and colored coatings (dispersion-based coating materials).

The pigment preparations of the invention are further suitable for coloring macro-molecular materials of all kinds, examples being natural and synthetic fiber materials, preferably cellulose fibers, and also for the mass coloring of paper, and for coloring laminate. Further applications are the production of printing inks, examples including inks for textile, flexographic, decorative or gravure printing, wallpaper colors, water-thinnable paints, wood preservation systems, spin coloring systems for viscose, varnishes, sausage skins, seed, fertilizers, glass, especially glass bottles, and also for the mass coloring of roof shingles, for coloring for renders, concrete, wood stains, colored pencil leads, fibertip pens, waxes, paraffins, graphics inks, ballpoint pen pastes, chalks, laundry detergents and cleaning products, shoe polishes, latex products, abrasives, and also for coloring plastics or high molecular mass materials of all kinds. Examples of high molecular mass organic materials include cellulose ethers and cellulose esters, such as ethylcellulose, nitrocellulose, cellulose acetate or cellulose butyrate, natural resins or synthetic resins, such as polymerization resins or condensation resins, e.g., amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, and polyacrylic esters, polyamides, polyurethanes or polyesters, rubber, casein, latices, silicone, and silicone resins, individually or in a mixture.

The pigment preparations of the invention are further suitable for producing printing inks for use in all conventional ink-jet printers, particularly for those based on the bubble jet or piezo process. These printing inks can be used to print paper and also natural or synthetic fiber materials, foils, and plastics. Additionally the pigment preparations of the invention can be used for printing any of a very wide variety of kinds of coated or uncoated substrate materials: for example, for printing paperboard, cardboard, wood and wood base materials, metallic materials, semiconductor materials, ceramic materials, glasses, glass and ceramic fibers, inorganic materials of construction, concrete, leather, comestibles, cosmetics, skin, and hair. This substrate material may be two-dimensionally planar or may be extended spatially, i.e., may be of three-dimensional form, and may be printed or coated completely or only in parts.

The pigment preparations of the invention are additionally suitable as colorants in electrophotographic toners and developers, such as one- or two-component powder toners (also called one- or two-component developers), magnetic toners, liquid toners, latex toners, polymerization toners and specialty toners. Typical toner binders in this context are addition-polymerization resins, polyaddition resins, and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may contain further ingredients, such as charge control agents, waxes or flow assistants, or may be subsequently modified with these adjuvants.

The pigment preparations of the invention are further suitable for use as colorants for powders and powder coating materials, especially for triboelectrically or electrokinetically sprayable powder coating materials, which are used to coat the surfaces of articles made, for example, of metal, wood, plastic, glass, ceramic, concrete, textile material, paper or rubber. Powder coating resins used here are typically epoxy resins, carboxyl- and hydroxyl-containing polyester resins, polyurethane resins, and acrylic resins, together with customary hardeners. Combinations of resins also find use. For example, epoxy resins are frequently used in combination with carboxyl- and hydroxyl-polyester resins. Examples of typical hardener components (depending on the resin system) are acid anhydrides, imidazoles, and also dicyandiamide and derivatives thereof, capped isocyanates, bisacylurethanes, phenolic resins and melamine resins, triglycidyl isocyanurates, oxazolines, and dicarboxylic acids.

Furthermore, the pigment preparations of the invention are suitable for use as colorants in inks, preferably ink-jet inks, such as, for example, those on an aqueous or nonaqueous basis ("solvent based"), microemulsion inks, UV-curable inks, and in inks which operate by the hot-melt process. Ink-jet inks generally contain in total 0.5% to 15%, preferably 1.5% to 8%, by weight (calculated on a dry basis) of the pigment preparation of the invention. Microemulsion inks are based on organic solvents, water, and, if desired, an additional hydrotropic substance (interface mediator). Microemulsion inks contain 0.5% to 15%, preferably 1.5% to 8%, by weight of the pigment preparation of the invention, 5% to 99% by weight of water, and 0.5% to 94.5% by weight of organic solvent and/or hydrotropic compound.

"Solvent based" ink-jet inks contain preferably 0.5% to 15% by weight of the pigment preparation of the invention, 85% to 99.5% by weight of organic solvent and/or hydrotropic compounds. UV-curable inks contain essentially 0.5% to 30% by weight of the pigment preparation of the invention, 0.5% to 95% by weight of water, 0.5% to 95% by weight of organic solvent or solvent mixture, 0.5% to 50% by weight of a radiation-curable binder, and, where appropriate, 0 to 10% by weight of a photoinitiator. Hot-melt inks are usually based on waxes, fatty acids, fatty alcohols or sulfonamides which are solid at room temperature and liquefy on heating, the preferred melting range being between about 60° C. and about 140° C. Hot-melt ink-jet inks are composed, for example, essentially of 20% to 90% by weight of wax and 1% to 10% by weight of the pigment preparation of the invention. They may further include 0 to 20% by weight of an additional polymer (as "dye dissolver"), 0 to 5% by weight of dispersing assistant, 0 to 20% by weight of viscosity modifier, 0 to 20% by weight of plasticizer, 0 to 10% by weight of tack additive, 0 to 10% by weight of transparency stabilizer (which prevents, for example, crystallization of the waxes), and 0 to 2% by weight of antioxidant.

In addition the pigment preparations of the invention are also suitable as colorants for color filters for flat panel displays, and also for both additive and subtractive color generation, and additionally for photoresists, and also as colorants for electronic inks ("e-inks") or electronic paper ("e-paper").

EXAMPLES

Assessment of a Pigment Preparation

The color strength and shade were determined in accordance with DIN 55986. For the rub-out test the emulsion paint or the varnish, after mixing with the pigment dispersion, was applied to a paint chart. Subsequently the applied coating was rubbed with the finger on the lower part of the paint chart. Incompatibility was present if the rubbed area is then more strongly colored than the adjacent untreated area (the rub-out test is described in DE 2 638 946). The coloristic data and the compatibilities with the media for coloring were determined with eight different white dispersions and up to two different varnishes:

1. White dispersion A (for exterior paints, water-based, 20% TiO$_2$)
2. White dispersion B (for exterior paints, water-based, 1% TiO$_2$)
3. White dispersion C (for exterior paints, water-based, 13.4% TiO$_2$)
4. White dispersion D (for exterior paints, water-based, 22.6% TiO$_2$)
5. White dispersion E (for exterior paints, water-based, polysiloxane emulsion binder, TiO$_2$, talc, calcium carbonate)
6. White dispersion F (for interior paints, water-based, polymer dispersion, free from solvents and plasticizers, low-emissions, TiO$_2$, calcium carbonate)
7. White dispersion G (emulsion paint especially for masonry, water-based, polymer dispersion, white pigments, inorganic pigments, silicatic fillers, talc, calcium carbonate)
8. White dispersion H (for interior paints, water-based, polyacrylates, TiO$_2$, calcium carbonate)
9. White varnish A (water-based, Viacryl VSC® binder, 20% TiO$_2$)
10. White varnish B (alkyd resin-based, Vialkyd AS® binder, organic solvent, 27% TiO$_2$).

The resistance to dryout was assessed by drawing down the pigment preparation onto a polyester clearview film using a 200 μm doctor blade and storing the drawdown under standardized conditions. Dryout was determined after a few minutes, after half an hour, after one day, and after three and seven days. The viscosity was determined using a cone-and-plate viscometer (Roto Visco 1) from Haake at 20° C. (titanium cone: Ø60 mm, 1°), the relationship between viscosity and shear rate being investigated within a range between 0 and 200 s$^{-1}$. The viscosities were measured at a shear rate of 60 s$^{-1}$.

For assessing the storage stability of the dispersions, the viscosity was measured directly after production of the preparation and also after four-week storage at 50° C. and after storage in a climatically controlled chamber at <0° C.

Production of a Pigment Preparation

The pigment, in the form alternatively of powder, granules or presscake, was pasted in deionized water, together with the dispersants and the other adjuvants, and then homogenized and predispersed using a dissolver (e.g., from VMA-Getzmann GmbH, Type AE3-M1) or other suitable apparatus. Subsequent fine dispersion took place by means of a bead mill (e.g., AE3-M1 from VMA-Getzmann) or else another suitable dispersing apparatus, with milling taking place with siliquarzite beads or zirconium mixed oxide beads of size d=1 mm, accompanied by cooling, until the desired color strength and coloristic properties were obtained. Thereafter the dispersion was adjusted with deionized water to the desired end pigment concentration, the grinding media was separated off, and the pigment preparation was isolated.

The pigment preparations described in the examples below were produced in accordance with the method described above, the following constituents being used in the amounts stated so as to give 100 parts of each pigment preparation. In the examples below, parts are by weight.

Example 1

| | |
|---|---|
| 20 parts | C.I. Pigment Violet 23 (component A) |
| 11 parts | component (B), formula (1) with R$^1$ and R$^7$ = methyl, R$^2$ and R$^6$ = ethylene, R$^3$ and R$^5$ = 1,4-phenylene, R$^4$ = 1,2-propylene, a, b, and d totaling on average around 35, c being on average around 2 |
| 10 parts | α-methyl-ω-hydroxy-polyethylene glycol ether (Mn 470-530 g/mol) (component D) |
| 8 parts | oxalkylated addition compound of bisphenol A and an amine, nonionic (component C) |
| 0.2 part | preservative (component D) |
| remainder | water (component E). |

The pigment preparation has a high color strength and is stable to flocculation. It can be incorporated very well into all eight white dispersions, with ready dispersibility. The rub-out test shows no differences in color strength as compared with the rubbed area in the six cases A, C, D, F, G, and H. In the case of white dispersions B and E, slight color differences are apparent in the rub-out test, but the pigment preparation is still highly compatible with these systems. The pigment preparation possesses good rheological properties and is found to be readily fluid and stable on storage. The viscosity after production is 468 mPa·s. Further, the preparation possesses very good dryout resistance, since it dries within 30 minutes to form an elastic film which does not crumble from the substrate. After seven days as well an elastic film is present which has not flaked from the substrate.

Example 2

| | |
|---|---|
| 40 parts | C.I. Pigment Black 7 (component A) |
| 8.5 parts | component (B), formula (1) with $R^1$ and $R^7$ = methyl, $R^2$ and $R^6$ = ethylene, $R^3$ and $R^5$ = 1,4-phenylene, $R^4$ = 1,2-propylene, a, b, and d totaling on average around 90, c being on average around 5 |
| 10 parts | α-methyl-ω-hydroxy-polyethylene glycol ether (Mn 470-530 g/mol) (component D) |
| 2 parts | oxalkylated addition compound of bisphenol A and an amine, nonionic (component C) |
| 0.5 part | sodium di-2-ethylhexylsulfosuccinate (component C) |
| 0.9 part | preservative (component D) |
| remainder | water (component E). |

The pigment preparation has a high color strength and is stable to flocculation. It can be incorporated very well into all eight white dispersions, with ready dispersibility. The rub-out test shows no differences in color strength as compared with the rubbed area in all cases. In these eight white dispersions the preparation is of "universal" compatibility. The pigment preparation possesses good rheological properties and is found to be readily fluid and stable on storage. The viscosity after production is 617 mPa·s. Further, the preparation possesses very good dryout resistance, since it dries within 30 minutes to form an elastic film which does not crumble from the substrate. After seven days as well an elastic film is present which has not flaked from the substrate.

Comparative Example 2a

| | |
|---|---|
| 40 parts | C.I. Pigment Black 7 (component A) |
| 8.5 parts | oxalkylated fatty alcohol, nonionic (component C) |
| 10 parts | α-methyl-ω-hydroxy-polyethylene glycol ether (Mn 470-530 g/mol) (component D) |
| 2 parts | oxalkylated addition compound of bisphenol A and an amine, nonionic (component C) |
| 0.5 part | sodium di-2-ethylhexylsulfosuccinate (component C) |
| 0.9 part | preservative (component D) |
| remainder | water (component E). |

The pigment preparation has a high color strength with a clean shade but is not stable to flocculation in various white dispersions and varnishes. Only into three white dispersions tested can the pigment preparation be incorporated well with ready dispersibility (A, D, and H). Here, the rub-out test shows no differences in color strength. In four white dispersions (B, C, F, and G) and in the white varnish A the rub-out test does show color differences, so that flocculation phenomena can be detected. The pigment preparation cannot be incorporated into white dispersion E or into white varnish B.

Example 3

| | |
|---|---|
| 40 parts | C.I. Pigment Red 146 (component A) |
| 7 parts | component (B), formula (1) with $R^1$ and $R^7$ = methyl, $R^2$ and $R^6$ = ethylene, $R^3$ and $R^5$ = 1,4-phenylene, $R^4$ = 1,2-propylene, a, b, and d totaling on average around 35, c being on average around 2 |
| 20 parts | propylene glycol (component D) |
| 4 parts | oxalkylated addition compound of bisphenol A and an amine, nonionic (component C) |
| 0.2 part | preservative (component D) |
| remainder | water (component E). |

The pigment preparation has a high color strength and is stable to flocculation. It can be incorporated very well into all eight white dispersions and into white varnish A, with ready dispersibility. The rub-out test shows no differences in color strength as compared with the rubbed area in all cases. In the application systems tested the preparation is of "universal" compatibility. The pigment preparation possesses good rheological properties and is found to be readily fluid and stable on storage. The viscosity after production is 744 mPa·s. Further, the preparation possesses very good dryout resistance, since it dries within 30 minutes to form an elastic film which does not crumble from the substrate.

Example 4

| | |
|---|---|
| 35 parts | C.I. Pigment Yellow 154 (component A) |
| 4.5 parts | component (B), formula (2) with $R^1$ and $R^7$ = methyl, $R^2$ and $R^6$ = ethylene, $R^3$ = 1,4-phenylene, $R^4$ = ethylene, $R^5$ = ethylene and 1,2-propylene as a statistical mixture, x and y being in each case on average around 45, z being on average 35, a being on average around 3, b being on average around 10 |
| 15 parts | propylene glycol (component D) |
| 0.9 part | preservative (component D) |
| remainder | water (component E). |

The pigment preparation has a high color strength with a very clean shade and is stable to flocculation. It can be incorporated very well into all eight white dispersions A to H, with ready dispersibility. The rub-out test shows no differences in color strength as compared with the rubbed area in all cases. In relation to the dispersions tested, therefore, the preparation is of "universal" compatibility. The pigment preparation possesses excellent rheological properties and is found to be readily fluid and stable on storage. The viscosity after production is 37 mPa·s. Further, the preparation possesses very good dryout resistance, since it dries within 30 minutes to form an elastic film which does not crumble from the substrate.

Example 5

| | |
|---|---|
| 40 parts | C.I. Pigment Yellow 97 (component A) |
| 4.5 parts | component (B), formula (1) with $R^1$ and $R^7$ = methyl, $R^2$ and $R^6$ = ethylene, $R^3$ and $R^5$ = 1,4-phenylene, $R^4$ = 1,2-propylene, a, b, and d totaling on average around 35, c being on average around 2 |
| 10 parts | propylene glycol (component D) |

-continued

| | |
|---|---|
| 5 parts | oxalkylated fatty alcohol, nonionic (component C) |
| 0.2 part | preservative (component D) |
| remainder | water (component E). |

The pigment preparation has a high color strength and is stable to flocculation. It can be incorporated very well into all eight white dispersions, with ready dispersibility. The rub-out test shows in all cases no differences in color strength in comparison with the rubbed area. The pigment preparation possesses good rheological properties and is found to be readily fluid and stable on storage. The viscosity after production is 435 mPa·s. Moreover, the preparation possesses good dryout resistance, since it dries within 30 minutes to form a film which does not crumble from the substrate.

Example 6

| | |
|---|---|
| 40 parts | C.I. Pigment Yellow 151 (component A) |
| 3 parts | component (B), formula (1) with $R^1$ and $R^7$ = methyl, $R^2$ and $R^6$ = ethylene, $R^3$ and $R^5$ = 1,4-phenylene, $R^4$ = 1,2-propylene, a, b, and d totaling on average around 35, c being on average around 2 |
| 10 parts | polyethylene glycol (Mn 260-240 g/mol) (component D) |
| 1 part | oxalkylated fatty alcohol, nonionic (component C) |
| 0.5 part | defoamer (component D) |
| 0.2 part | preservative (component D) |
| remainder | water (component E). |

The pigment preparation has a high color strength with a clean shade and is stable to flocculation. It can be incorporated very well into all eight white dispersions and into the two different varnishes, with ready dispersibility. The rub-out test shows no differences in color strength as compared with the rubbed area in all cases. In the systems tested, therefore, the preparation is of "universal" compatibility. The pigment preparation possesses excellent rheological properties and is found to be readily fluid and stable on storage. The viscosity after production is 34 mPa·s. Further, the preparation possesses very good dryout resistance, since it dries within 30 minutes to form an elastic film which does not crumble from the substrate.

Example 7

| | |
|---|---|
| 20 parts | C.I. Pigment Red 122 (component A) |
| 4 parts | component (B), formula (1) with $R^1$ and $R^7$ = methyl, $R^2$ and $R^6$ = ethylene, $R^3$ and $R^5$ = 1,4-phenylene, $R^4$ = 1,2-propylene, a, b, and d totaling on average around 35, c being on average around 2 |
| 9 parts | polyethylene glycol (Mn 260-240 g/mol) (component D) |
| 1 part | oxalkylated fatty alcohol, nonionic (component C) |
| 0.5 part | defoamer (component D) |
| 0.2 part | preservative (component D) |
| remainder | water (component E). |

The pigment preparation has a high color strength with a clean shade and is stable to flocculation. It can be incorporated very well into all eight white dispersions, with ready dispersibility. The rub-out test shows no differences in color strength as compared with the rubbed area in all cases. The pigment preparation possesses excellent rheological properties and is found to be readily fluid and stable on storage. The viscosity after production is 27 mPa·s. Further, the preparation possesses very good dryout resistance, since it dries within 30 minutes to form an elastic film which does not crumble from the substrate.

What is claimed is:

1. An aqueous pigment preparation, comprising
(A) 20% to 70% by weight of at least one organic pigment, inorganic pigment or mixture thereof,
(B) 1% to 15% by weight of at least one water-soluble or water-dispersible nonionic oligoester or polyester,
(C) 0.1% to 15% by weight of the at least one dispersant, surfactant or mixture thereof,
(D) 0.1% to 20% by weight of the at least one additive, and
(E) 5% to 78.8% by weight of water,
based in each case on the total weight of the pigment preparation, wherein the at least one water-soluble or water-dispersible nonionic oligoester or polyester is one or more compounds of the formula (1):

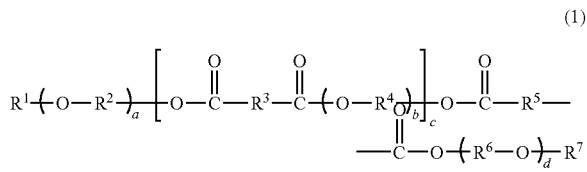

(1)

wherein
$R^1$ and $R^7$ are a linear or branched $C_1$-$C_{18}$ alkyl radical,
$R^2$, $R^4$, and $R^6$ independently of one another are $C_1$-$C_8$ alkylene,
$R^3$ and $R^5$ are arylene or alkarylene,
a, b, and d are a number between 1 and 200, the sum of a, b, and d being at least 5,
c is a number between 1 and 20.

2. The pigment preparation as claimed in claim 1, wherein the at least one organic pigment, inorganic pigment or mixture thereof is at least one organic pigment selected from the group consisting of monoazo, disazo, laked azo, β-naphthol, naphthol AS, benzimidazolone, disazo condensation, azo metal complex, phthalocyanine, quinacridone, perylene, perinone, thioindigo, anthanthrone, anthraquinone, flavanthrone, indanthrone, isoviolanthrone, pyranthrone, dioxazine, quinophthalone, isoindoline, isoindolinone or diketopyrrolo-pyrrole pigments, an acidic to alkaline carbon black selected from the group consisting of furnace blacks and gas blacks, and a combination thereof.

3. The pigment preparation as claimed in claim 1, wherein the at least one organic pigment, inorganic pigment or mixture thereof is at least one inorganic pigment selected from the group consisting of titanium dioxides, zinc sulfides, zinc oxides, iron oxides, manganese iron oxides, chromium oxides, ultramarine, nickel or chromium antimony titanium oxides, cobalt oxides, mixed oxides of cobalt and aluminum, rutile mixed-phase pigments, sulfides of rare earths, bismuth vanadates, extender pigments, and a combination thereof.

4. The pigment preparation as claimed in claim 1, wherein the at least one organic pigment, inorganic pigment or mixture thereof is an organic pigment combined with carbon black, titanium dioxide or both.

5. The pigment preparation as claimed in claim 1, wherein $R^1$ and $R^7$ are independently methyl or ethyl,
$R^2$, $R^4$, and $R^6$ are ethylene, 1,2-propylene or mixtures thereof,
$R^3$ and $R^5$ are independently 1,4-phenylene or 1,3-phenylene,
a, b and d are a number between 1 and 100, the sum of a, b, and d being at least 5;
c is a number between 1 and 10.

6. The pigment preparation as claimed in claim 1, wherein the at least one water-soluble or water-dispersible nonionic oligoester or polyester is one or more compounds of the formula (2):

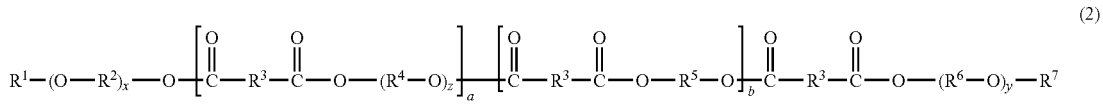

(2)

wherein
$R^1$ and $R^7$ are a linear or branched $C_1$-$C_{18}$ alkyl radical,
$R^2$ and $R^6$ are ethylene,
$R^3$ is 1,4-phenylene or 1,3-phenylene,
$R^4$ is ethylene,
$R^5$ is ethylene, 12-propylene or a combination thereof,
x and y independently of one another are a number between 1 and 500,
z is a number between 10 and 140,
a is a number between 1 and 12,
b is a number between 7 and 40, with a+b being at least 11.

7. The pigment preparation as claimed in claim 6, wherein
$R^1$ and $R^7$ are a linear or branched $C_1$-$C_4$ alkyl radical,
$R^2$ and $R^6$ are each ethylene,
$R^3$ is 1,4-phenylene or 1,3-phenylene,
$R^4$ is ethylene,
$R^6$ is ethylene, 1,2-propylene or a combination thereof,
x and y independently of one another are a number between 3 and 45,
z is a number between 18 and 70,
a is a number between 2 and 5,
b is a number between 8 and 12, a+b being a number between 12 and 17.

8. A process for producing a pigment preparation as claimed in claim 1, comprising the steps of dispersing component (A) in the form of powder, granules or aqueous presscake in the presence of water (E) and of component (B), subsequently admixing, optionally, water, and, optionally (C) and/or (D), and, optionally, diluting the resultant aqueous pigment dispersion with water.

9. A process for pigmenting a natural or synthetic material comprising the step of pigmenting the natural or synthetic material with a pigment preparation as claimed in claim 1.

10. A pigmented or colored composition comprising a pigment preparation as claimed in claim 1, wherein the composition is selected from the group consisting of aqueous coating materials, emulsion paints, colored coatings dispersion based varnishes, water-thinnable paints, wallpaper inks, and printing inks.

11. A pigmented article or composition comprising a pigment preparation as claimed in claim 1, wherein the article or composition is selected from the group consisting of natural fiber materials, synthetic fiber materials, cellulose fibers, paper, laminate, printing inks, ink-jet inks, electrophotographic toners, powder coating materials, color filters, electronic inks, electronic paper, wood preservation systems, viscose, sausage skins, seed, fertilizers, glass bottles, roof shingles, renders, concrete, wood stains, colored pencil leads, fibertip pens, waxes, paraffins, graphics inks, ballpoint pen pastes, chalks, detergents, cleaning products, shoe polishes, latex products, abrasives, and plastics.

12. A natural or synthetic material made in accordance with the process of claim 9.

* * * * *